United States Patent [19]

West et al.

[11] 4,200,983
[45] May 6, 1980

[54] SELF-EXTENDING RULE

[75] Inventors: Robert F. West, West Simsbury; James Elmore, Simsbury, both of Conn.

[73] Assignee: The Stanley Works, New Britain, Conn.

[21] Appl. No.: 10,302

[22] Filed: Feb. 8, 1979

[51] Int. Cl.$^2$ .......................... G01B 3/02; B65H 75/16
[52] U.S. Cl. ...................................... 33/138; 242/84.8
[58] Field of Search ................. 33/138, 139; 242/84.8, 242/107.3

[56] References Cited

U.S. PATENT DOCUMENTS

| 3,228,626 | 1/1966 | Quenot ............................. 242/84.8 |
| 4,155,168 | 5/1979 | DuBois ................................ 33/138 |

FOREIGN PATENT DOCUMENTS 709770  5/1931  France ........................................ 33/138

*Primary Examiner*—Harry N. Haroian
*Attorney, Agent, or Firm*—Prutzman, Kalb, Chilton & Alix

[57] ABSTRACT

An improved case for a self-extending rule having a resilient blade which assumes a straight position when in a relaxed state and has a pair of case sections formed with flat top, bottom, and back walls, and arcuate side walls enclosing a cylindrical interior chamber and with a front wall having a generally arcuate opening in a lower sector thereof defined by the rim of the adjacent side wall and the edge of a reentrant web extending from the opposite side wall. The underside of the web has a center post extending into the chamber to mount a cylindrical cup for nesting the convolutions of the blade when inserted endwise through said arcuate opening and underneath the edge of the web. A brake is mounted for rectilinear movement in a radial opening in the top wall of the case adjacent the front side of the cup and is biased into engagement with a converging open rim of the cup. The back of the case is spaced from the bottom of the cup and forms an annular chamber in which pivotal weights are mounted to rotate with the cup and engage the annular wall of the chamber for limiting the speed of rotation of the cup.

9 Claims, 5 Drawing Figures

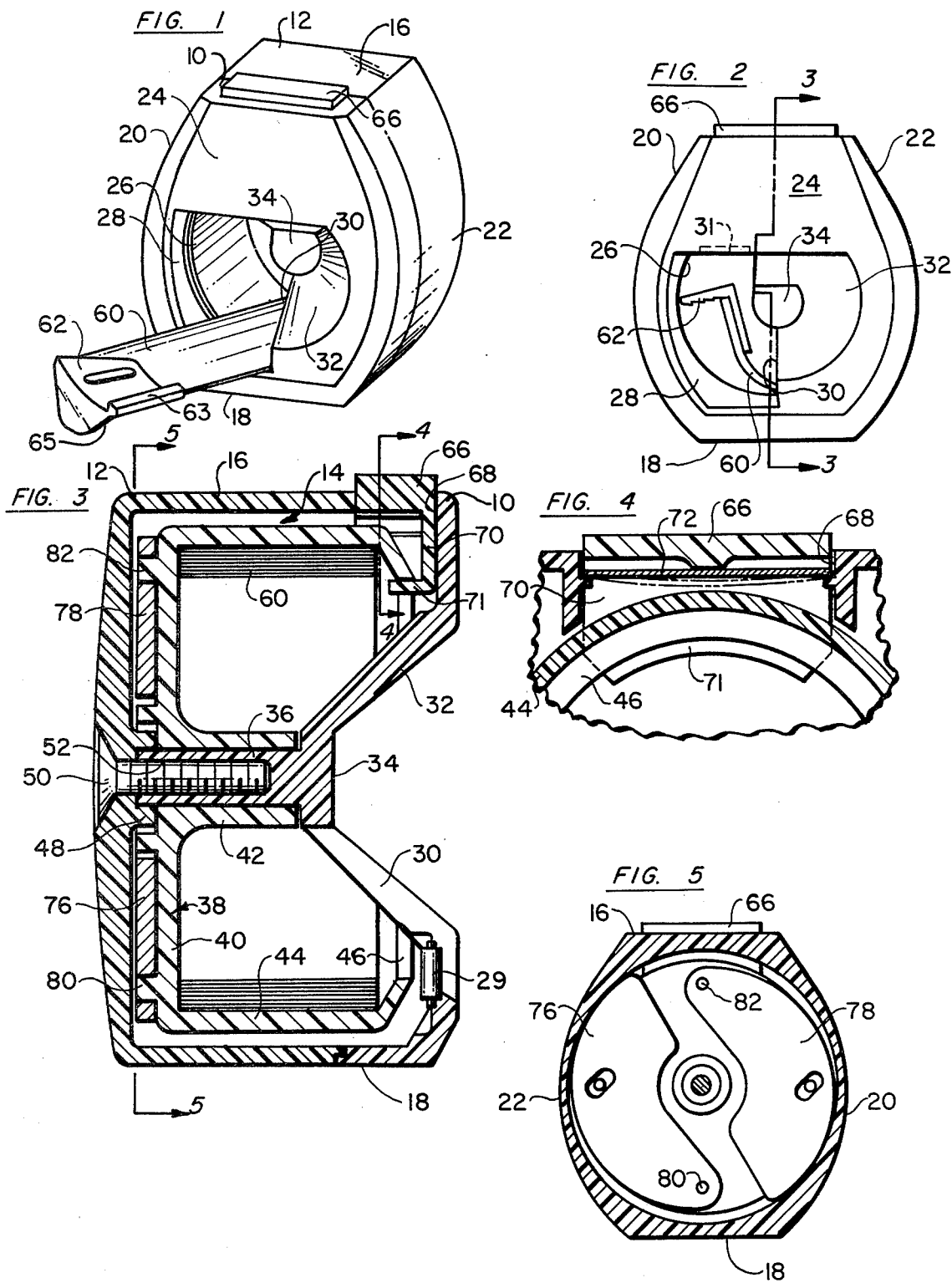

SELF-EXTENDING RULE

The present invention relates to rules of the self-extending type and is concerned, more particularly, with an improved case or housing for such a rule.

In the type of rule to which the present invention relates, the rule blade is a strip of metal which is curved transversely providing it with a concavo-convex cross section. When released, such a blade has an inherent tendency to uncoil and assume a straight longitudinal configuration. In a self-extending rule of the type involved, the case or housing is provided with an inner rotatable cup for receiving the coiled blade. The blade is not secured or attached to the cup but is merely pushed endwise into the cup from the open side thereof to form an internally or inside wound coil in which each successive turn of the coil lies within the previously formed turn.

An object of the invention is to provide an improved case or housing which facilitates the insertion of the blade into the case and its emergence therefrom, which is easy to use, and which has improved means for controlling the braking and release of the cup.

Another object is to provide such a case which is of simplified construction for economical manufacture, which is of rugged design so that it will have a long service life, and which has an improved appearance so as to be commercially attractive and competitive with existing rules.

Other objects will be in part obvious and in part pointed out in more detail in the following description and the accompanying drawing which sets forth an illustrative embodiment of the invention.

BRIEF DESCRIPTION OF THE DRAWINGS

In the drawings:

FIG. 1 is a perspective view of a self-extending rule having an improved case embodying the invention with the blade partially extended;

FIG. 2 is a front view of the rule shown in FIG. 1 with the blade fully retracted and the tape hook nested within the coiled convolutions of the blade;

FIG. 3 is an enlarged cross-sectional view taken along the line 3—3 of FIG. 2.

FIG. 4 is a fragmentary cross-sectional view taken along the line 4—4 of FIG. 3; and FIG. 5 is a cross-sectional view of reduced size taken along the line 5—5 of FIG. 3.

DESCRIPTION OF THE PREFERRED EMBODIMENT

Referring to the drawing showing a preferred embodiment of the invention, it will be seen that the rule is provided with a case formed of two mating sections 10 and 12 arranged in side-by-side relationship. The sections 10 and 12 are each preferably one-piece molded parts formed of a durable high impact strength plastics material. The two sections 10 and 12 define a generally cylindrical inner chamber 14.

The section 10 is preferably molded with a flat top 16, a flat bottom 18, and arcuate side walls 20 and 22. The front wall 24 is provided in its lower left hand sector, as viewed in FIG. 2, with an opening 26 defined at its outer edge by the arcuate beveled rim 28 of the case and inwardly by the generally vertically extending edge 30 of an inwardly depressed or reentrant web 32 which tapers inwardly to a flat section 34 at approximately the midpoint of the case. The inner surface of the flat section 34 is provided with an inwardly projecting post 36 extending axially into the chamber 14.

Rotatably mounted on the post 36 is a cup 38 having a rear wall 40 formed with a hub 42 which is rotatably journaled on the post 36. The rim of the cup 38 is a cylindrical wall 44 having an inwardly turned and angularly related flange 46. The cup 38 is retained in a forward position on the post 36 and spaced a short distance from the back wall of the case section 12 by an apertured boss 48 having a recess into which the post 36 extends when the case is assembled. Case section 12 has the same peripheral configuration as case section 10 and is fastened to section 10 by a screw 50 extending through the aperture of the boss 48 and engaging in the tapped center hole 52 of the post 36.

As illustrated in FIG. 1, a blade 60 of concavo-convex cross-section may be inserted endwise through the opening 26 and underneath the edge 30 into contact with the inner surface of the cylindrical wall 44 of the cup 38. As the blade 60 is fed into the case in this manner, it causes the cup 38 to rotate and the blade arranges itself in a coil within the cup with each succeeding convolution lying within the previously formed convolution. Because of its inherent bias, the blade 60 when being pushed into the case or when being released has a tendency to cause its edge to engage against the lower corner of the opening 26. Therefore, if desired, a small roller 29 may be mounted at the lower end of the edge 30 to reduce friction and wear. Friction and wear can also be reduced by providing the blade 60 with a thin transparent plastic coating if desired.

The outer end of the blade 60 preferably has a hook 62 attached thereto. The hook 62 can easily be tucked into the opening 26 and placed out of the way by being nested within the coiled convolutions of the blade as shown in FIG. 2 when the rule is not in use. The side edge of hook 62 is provided with an upstanding side wall 63 which may be engaged by a finger to retrieve the hook from its nested position. The hook 62 is sufficiently large so that it cannot pass under the edge 30 or beyond an inwardly extending ledge 31 formed on the inside of wall 24 at the top edge of the opening 26 thereby preventing the end of the blade from moving to a portion of the case where it would be difficult to reach if not inaccessible. When the end of the blade 60 is moved outwardly to a position projecting from the side of the case as shown in FIG. 1 and if the cup 38 is free to rotate, the blade 60 will self-extend itself by projecting itself outwardly to a linear condition and simultaneously turning the cup 38 as it unwinds. The edge 65 of the hook is angled to permit the lower edge of the blade 60 to hug a surface closely to minimize the distance the edge is held above the surface and, therefore, any parallax error.

To control the rotation of the cup 38 and/or to hold the blade 60 in selected extended position, there is provided a brake consisting of a push button type thumb piece 66 mounted for reciprocal movement in a radial opening 68 aligned with the front of the cup 38 and having a depending portion 70 extending below the rim of the cup 38 and terminating in an arcuate brake shoe portion 71 underneath the cup flange 46 for engagement with the lower edge thereof. The push button 66 is urged upwardly by a leaf spring 72 which biases the brake shoe portion 71 against the flange 46 thereby creating a strong braking action. The brake is released when the push button 66 is manually depressed. The user can easily depress the button 66 with his thumb while holding the case in the palm of his hand in a one-handed operation.

In addition to the brake, there also is provided a speed control which is generally similar to that disclosed in prior U.S. Pat. No. 3,889,897 owned by the assignee of the present application. The speed control consists of a pair of weights 76 and 78 pivotally supported on the back of the rear wall 40 of the cup 38 by pins 80 and 82, respectively. The weights 76 and 78 are adapted to pivot outwardly in response to centrifugal force when the cup 38 rotates thereby causing them to engage and rub against a cylindrical inner surface to the case section 12 creating a drag which increases with the speed of rotation thereby producing a governing action limiting the blade extension speed when the blade is released.

As will be apparent to persons skilled in the art, various modifications, adaptations and variations of the foregoing specific disclosure may be made without departing from the teachings of the present invention.

We claim:

1. A case for a self-extending rule having a resilient blade which assumes a straight position in its relaxed state comprising a pair of case sections having flat top, bottom, and back walls, and arcuate side walls enclosing a generally cylindrical chamber, a front wall on the case having a generally arcuate opening in a lower sector thereof defined by a rim on the adjacent side wall and the edge of an reentrant web extending from the opposite side wall, the innermost portion of the web having a center post extending from its underside and projecting axially into the chamber, a cup having a hub rotatably mounted on the center post and having its open side facing the front wall, said cup being adapted to receive nested convolutions of the blade inserted endwise through said opening and underneath the edge of the web, a brake mounted for rectilinear movement in a radial opening in the flat top wall of the rule, said brake having a portion engageable with the open lip of the cup, and a spring biasing the brake into engagement with the cup.

2. A case as defined in claim 1 wherein said rim defining the front wall opening is beveled and the lip of the cup has an inwardly extending angularly related flange.

3. A case as defined in claims 1 or 2 wherein a roller is mounted at the edge of the web for engagement by the edge of the blade.

4. A case as defined in claim 1 wherein an inwardly extending ledge is provided at the top of the front wall opening.

5. A case as defined in claim 1 wherein the inside of the back wall of the case is provided with a centrally located boss engagable with the bottom of the cup continuing to space it from the back wall.

6. A case as defined in claim 5 wherein the bottom of the cup has a pair of weights pivotally mounted thereon which are adapted to swing outwardly by centrifugal force into engagement with a cylindrical periphery of the chamber when the cup is rotated.

7. A self-extending rule having a resilient blade which assumes a straight position in its relaxed state comprising a case having generally flat top, bottom and back walls, and arcuate side walls enclosing a generally cylindrical chamber, a front wall on the case having a generally arcuate opening in a lower sector thereof defined by a rim on the adjacent side wall and the edge of a reentrant web extending from the opposite side wall, the innermost portion of the web having a center post extending from its underside and projecting axially into the chamber, a cup having a hub rotatably mounted on the center post and having its open side facing the front wall, said cup being adapted to receive nested convolutions of the blade inserted endwise through said opening and underneath the edge of the web, a hook at the outer end of the blade terminating in a tip extending perpendicularly over the end of the blade with the lower edge of the tip angled to converge toward the end of the tip to permit the hook to pass through said arcuate opening for nesting within the case.

8. A rule as defined in claim 7 wherein the hook has an upstanding side wall to be manually engaged to retrieve the hook from a nested position.

9. A rule as defined in claim 7 wherein the angled lower edge of the tip merges into the end surface of the tip by an arcuate radius.

* * * * *